United States Patent Office 3,351,982
Patented Nov. 14, 1967

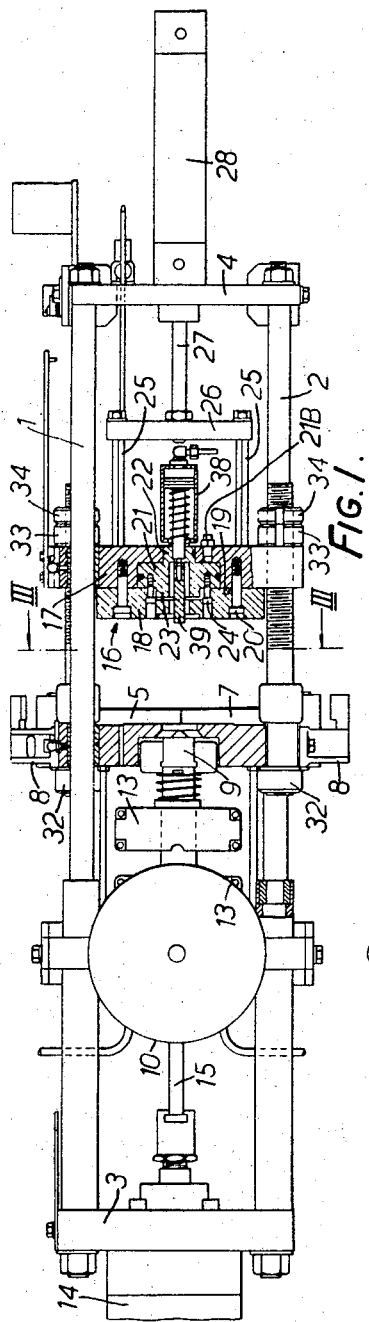
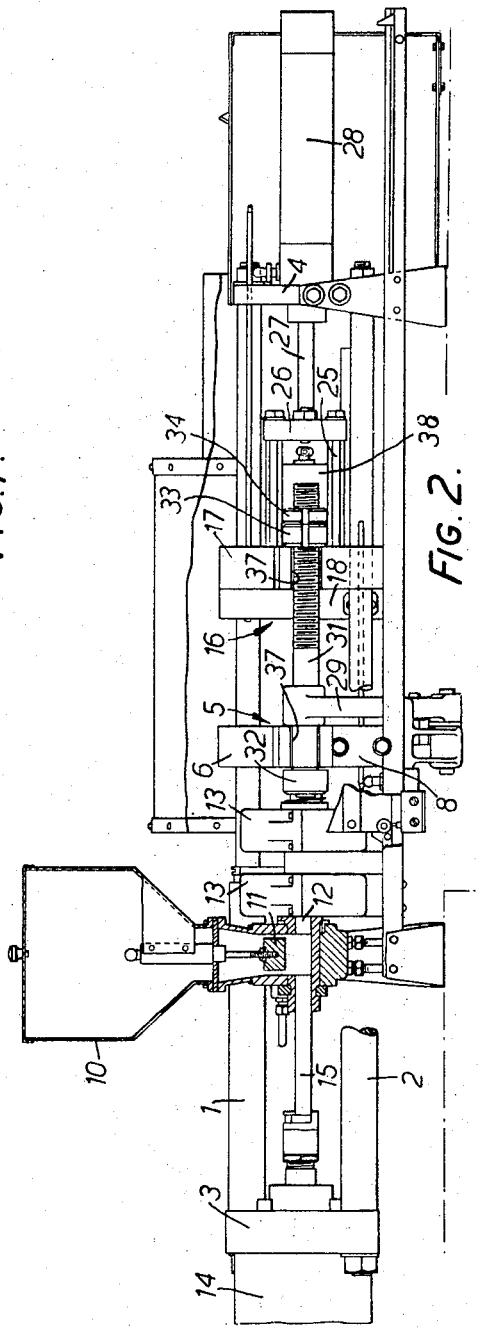

3,351,982
INJECTION MOULDING MACHINES
Harold E. Jackson and Michael W. Weeks, Devon, England, assignors to Petrol Injection Limited, Devon, England, a British company
Filed Mar. 22, 1965, Ser. No. 441,765
4 Claims. (Cl. 18—30)

ABSTRACT OF THE DISCLOSURE

An injection moulding machine having a piston housed by the moving platen to apply locking pressure to the platens when in the closed position. In that position a pair of locking bars engage in slots in the edges of the fixed and movable platens so that the locking pressure reaction is taken by fixed abutments carried by the locking bars and lying adjacent the outer faces of the platens. The locking bars are carried at the top ends of pivoted swing arms the lower ends of which are connected by a piston-cylinder device operable by fluid pressure to swing the locking bars transversely of the platen movement, between locking and non-locking positions.

---

Figure 3:
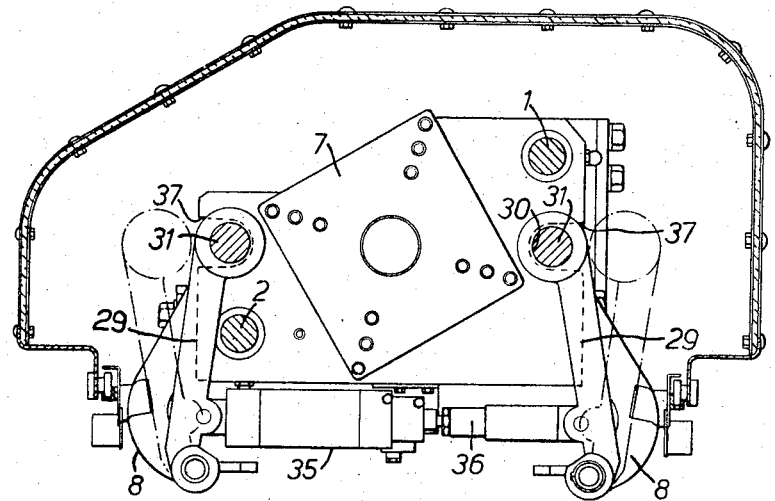

This invention relates to injection moulding machines.

Injection moulding machines commonly have die supporting members in the form of platens, on which die members can be removably mounted, and which are movable between open and closed positions during the injection cycle. During injection of molten material into the mould defined by the co-operating dies, the platens are locked in the closed position and the locking may be effected by toggle arms, operable in the direction of opening and closing of the platens, actuated by pneumatic or hydraulic cylinders. A feature of such machines has been longitudinal tie bars that, as well as the toggle assemblies, are susceptible to stretching during use of the machine giving rise to the possibility of relative movement between the platens. To achieve efficient operation of such machines quite critical adjustment of the toggle clamps has been required.

It is an object of the present invention to provide an injection moulding machine in which improved efficiency of locking of the die platens can be obtained without critical adjustment of the locking arrangement.

According to the present invention, an injection moulding machine includes a pair of locking arms movable transversely to the direction of opening and closing of the platen assemblies and respectively engageable with opposite sides of those assemblies when the latter are in a closed position, and means for applying fluid pressure to lock the platen assemblies in the closed position with the reaction of the locking pressure being taken by abutments on the locking arms.

The locking arms can locate in slots in the platen assemblies and a pair of spaced abutments on each of the arms engage with the platen assemblies, located outwardly of those members in the direction of opening and closing and adjacent thereto, when the platen assemblies are in a closed position. One of the platen assemblies can include two parts, one of which is a die support, relatively movable in the direction of opening and closing of the platen assemblies, fluid pressure being applied to cause movement between the parts so that the die support moves towards the other platen assembly, supporting the matting die, the reaction being taken by the other part which abuts against one of the abutments on each of the arms, so that the dies are locked in the closed position.

The locking arms can be swingably mounted and fluid pressure operated between positions of engagement and non-engagement with the platen assemblies. In a particular embodiment two locking arms are connected one to a fluid pressure cylinder and the other to the ram of the cylinder so that on operation of the cylinder to cause retraction of the ram, the arms are swung into engagement with the die support members.

The use of a locking arrangement according to the invention is advantageous in that the abutment members on the locking arms can be located immediately adjacent the platen assemblies when the latter are closed so that the movement between the platen assemblies required to lock them is very small, typically of the order of ⅛ inch, and variation of the extent of movement does not affect the locking efficiency.

In a particular embodiment of the invention, one of the platen assemblies is movable and the other fixed, the movable assembly being pneumatically operated between open and closed positions. Following operation of the movable platen assembly to the closed position, the locking arms are swung into engagement with the assemblies by a pneumatic cylinder and locking pressure applied hydraulically to the platen assemblies via an intensifier. A pneumatic cylinder then injects heated molten material into dies carried by the platen assemblies and, after cooling, the hydraulic locking pressure is released, the locking arms moved out of engagement with the platen assemblies, the movable platen assembly drawn back to an open position and a pneumatic cylinder operated to eject the completed moulding. This cycle of operation can readily be controlled automatically, e.g. by an arrangement incorporating electronic timers.

Figure 4:
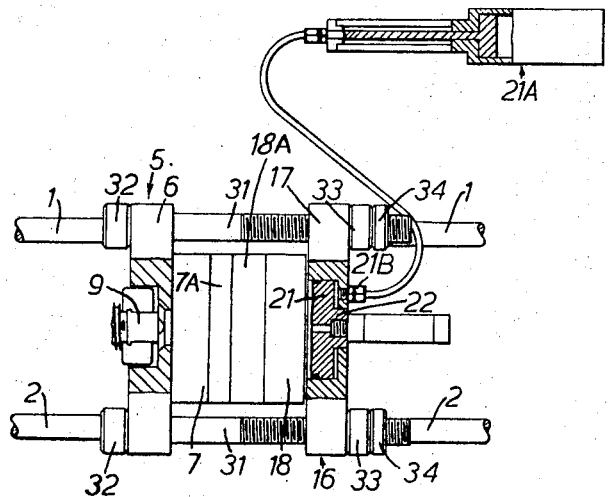

By way of example, an embodiment of the invention will be described in greater detail with reference to the accompanying drawings, in which:

FIG. 1 is a partly sectioned plan view of an injection machine embodying the invention, FIG. 2 is a partly sectioned side view of FIG. 1, FIG. 3 is a section on the line III—III in FIG. 1, and FIG. 4 is a schematic detail showing the manner of connection of a mould locking pressure source to a piston in the movable platen.

The injection moulding machine has a supporting framework comprising a pair of cylindrical guide bars 1, 2 braced at either end by cross-members 3, 4.

Intermediate the cross-members 3, 4 is a fixed platen assembly 5 having a bolster 6 and platen 7, the bolster 6 being secured to the guide bars 1, 2 by support arms 8. Located in a recess in the bolster 6 is an injection nozzle 9 which locates with a central aperture in the platen 7. Material to be injected is stored, in powdered or granular form, in a hopper 10 supported on the guide bars 1 and 2 between the platen assembly 5 and the cross-member 3 and is fed, by a pneumatically operated plunger 11, into a conduit 12 communicating with the injection nozzle 9. Associated with the conduit 12 are two induction heaters 13, which serve to melt the solid injection material and a pneumatic cylinder 14 secured to the cross-member 3. The cylinder 14 has a plunger 15 movable into the bore of the conduit 12 to inject molten material through the injection nozzle 9.

Slidably supported on the guide bars 1 and 2 is a movable platen assembly 16, located between the fixed platen assembly 5 and the cross-member 4. The assembly 16 comprises a bolster 17, through which the guide bars 1 and 2 pass in sliding relationship therewith, and a platen 18 supported on the face 19 of the bolster 17 by screws 20 that permit a limited movement between the bolster and that platen. A circular recess centrally disposed in the face 19 of the bolster accommodates a piston 21 having a projection 22 on one face that extends through an aperture to the face of the bolster opposite the face 19 and also having a projection 23 that extends into a recess in the platen 18. The platen 18 is secured to the piston 21 by screws 24 and there is a gap between the head of the projection 23 and the floor of the recess in the platen 18.

Secured to the bolster 17 are two rods 25 extending towards the cross-member 4 and linked by a cross-head 26 to which is secured the plunger 27 of a pneumatic cylinder 28 supported by the cross-member 4. Extension and retraction of the plunger 27 moves the platen assembly 16 between open and closed positions, in FIGS. 1 and 2 the plunger 27 being shown retracted and the platen assembly 16 drawn back to an open position.

As best shown in FIG. 3, a pair of swing arms 29 are pivoted to the support arms 8, one either side of the platen assemblies, so that they can be swung transversely of the direction of movement of the platen assembly 16 along the guide bars 1, 2. The swing arms are pivoted at their lower ends and at their upper ends each have a socket 30 through which passes a locking bar 31, fixedly secured to the swing arm, and extending parallel to the guide bars 1, 2. Each locking bar 31 has two collars 32, 33 spaced apart by a distance equal to the distance between the outer faces of the bolsters 6 and 17, when the latter are in a closed position. The collars 33 are adjustably positioned on the locking bars and can be secured in a desired position by locking collars 34.

Intermediate the pivoted ends of the swing arms 29 and the sockets 30, the arms are pivoted one to the body of a pneumatic cylinder 35 and the other to the plunger 36 of the cylinder 35. The arrangement is such that on relative extension between the plunger 36 and the cylinder 35, the arms 29 swing outwardly to the broken line position shown in FIG. 3. In that position of the swing arms, the movable platen assembly 16 can be moved between open and closed positions by operation of the pneumatic cylinder 28.

With the platen assembly 16 in a closed position, relative retraction between the plunger 36 and the cylinder 35 causes the swing arms 29 to move to the full line position shown in FIG. 3 in which the locking bars 31 engage in slots 37 formed in the bolsters 6 and 17, the collars 32 and 33 on each swing arm locating immediately outwardly of the bolsters 6 and 17 respectively.

The piston 21 within the moving platen assembly 16 is actuated by fluid pressure applied via coupling 21B from a high pressure hydraulic intensifier 21A, shown diagrammatically in FIG. 4, operated by a pneumatic cylinder not shown. With the platen assemblies in a closed position, application of the high hydraulic pressure to the piston 21 causes it to move, together with the platen 18, towards the fixed platen 5, the extent of movement being limited by the screws 20. This movement serves to apply a high pressure to mould dies 7A and 18A (FIG. 4) secured on the platens 7 and 18, the reaction being taken by the bolster 17 which bears against the collars 33. This arrangement permits positive locking of the dies in a closed position and no critical adjustments are necessary.

The machine also includes a pneumatic cylinder 38 to the plunger of which is secured an ejection pin 39 extending through apertures in the piston 21 and the platen 18, the cylinder 38 being secured to the piston 21. Operation of the cylinder 38 to extend the plunger thereof causes the ejection pin 39 to project through a male die secured to the platen 18 and to drive a completed moulding off the male die.

The guide rods 1 and 2 are so positioned relative to one another that, from the operating side of the machine (that shown in FIG. 2), the guide rod 1 more remote from the operator is higher than the other guide rod 2 so that the working faces of the platens 7 and 18 are accessible with the minimum of obstruction. This positioning of the guide rods 1 and 2 is best shown in FIG. 3.

The machine may be operated automatically, for example by an electronic control apparatus, to perform repetitive injection cycles, one of which will be described.

With the movable platen assembly 16 retracted to an open position as shown in FIGS. 1 and 2, required dies are secured to the platens 7 and 18, the male die being secured to the platen 18 and the female die to the platen 7.

The pneumatic cylinder 28 is operated to move the platen assembly 16 towards the platen assembly 5 so that the dies are closed together. Then, the pneumatic cylinder 35 is operated to cause retraction between it and the plunger 36 so that the swing arms 29 move to the position shown in full lines in FIG. 3 with the locking bars 31 received by the slots 37 in the bolsters 6 and 17, the collars 32 and 33 engaging the outer faces of the bolsters.

Actuation of the hydraulic intensifier 21A, by the aforementioned pneumatic cylinder, moves the platen 18 towards the platen 7, applying locking pressure to the dies, the reaction being taken by the outer face of the movable bolster 17 which abuts the collars 33 (see FIG. 4). It will be appreciated that the movement of the piston 21 is very small, e.g. ⅛ inch, being limited to that permitted by the screws 20.

Next, the cylinder 14 is operated to extend the injection plunger 15 injecting material, which has been melted by the induction heaters 13, from the heated cylinder 12 through the injection nozzle 9 into the locked dies. The plunger 15 then is retracted and the hopper cylinder operated to cause the plunger 11 to feed more material into the cylinder 12.

After the necessary cooling period, the hydraulic locking pressure is released and the gap between the bolster 17 and the platen 18, due to the locking movement of the piston 21 previously described, is closed by movement of the bolster 17 to produce a gap between it and the adjusting nuts 33. The pneumatic cylinder 35 is then actuated to cause disengagement of the locking bars from the bolsters 6 and 17 and the arms 29 to swing to the broken line position shown in FIG. 3. Next, the pneumatic cylinder 28 is operated to retract the movable platen assembly 16 and open the dies whilst the ejector cylinder is operated to cause the ejection pin to drive the completed moulding off the male die member.

Use of the method of die locking described above eliminates relatively massive longitudinal tie bars and the need for long stroke fluid pressure cylinders, hydraulic or pneumatic, to ensure adequate locking of the dies in a closed position. Further, the disadvantages associated with toggle locking arrangements are eliminated, particularly the possibility of movement between the platens due to stretch in the toggle assemblies and in the tie bars. The locking arrangement described with reference to the drawings is positive in its action and permits a degree of self-alignment between the platens. It also permits a wider tolerance in the length of inserts when moulding with them fully trapped. Additionally, this locking arrangement limits the force applied to the injection nozzle on engagement with the sprue bush to the force due to the pneumatic cylinder 28, which is relatively small.

We claim:

1. An injection moulding machine including a fixed platen and a movable platen, first fluid pressure means operable to move said movable platen towards and away from said fixed platen between respectively closed and open positions of said platen, each of said platens having opposite side edges in each of which is defined a slot, a pair of elongated locking members extending in the direction of movement of said movable platen and mounted to swing transversely relative to said direction of movement, a pair of swing arms each attached at one end to one of said locking members, a fluid pressure operated actuating means interconnecting said swing arms and operable to swing said arms to engage the locking members in the said slots in the said platens when the movable platen is in the said closed position, abutment members carried by each of said locking members and spaced in said direction of movement so that said platens are gripped between the spaced abutments on each locking member when the movable platen is in a closed position and said locking members are engaged in said slots, and in which said movable platen comprises two parts relatively movable in the said direction of movement of the movable platen, and second fluid pressure means operable when the said platens are in said closed position to effect relative movement in said direction of movement between the said relatively movable parts of the movable platen to lock the said platens in said closed position and to urge the said platens against the said abutment members with a force applied to said abutment members at right angles to the direction of movement of said locking members.

2. A machine according to claim 1, in which the said relatively movable parts of the said movable platen comprise a body part defining a recess and a piston part accommodated by said recess, the said second fluid pressure means being operable to move the said piston part towards the said fixed platen and to move the said body part away from said fixed platen into locking engagement with the said adjacent abutment members.

3. An injection moulding machine according to claim 1, in which each said locking member has two abutment members, one of which is fixed and the other adjustable in position along that member.

4. An injection moulding machine according to claim 1, in which the second fluid pressure means is a piston cylinder assembly the piston of which is operably connected to one swing arm and the cylinder of which is operably connected to the other swing arm.

References Cited

UNITED STATES PATENTS

| | | | |
|---|---|---|---|
| 2,862,238 | 12/1958 | Cuzzi | 18—30 |
| 3,120,039 | 2/1964 | Stubbe et al. | 164—341 X |
| 3,156,014 | 11/1964 | Wenger | 18—30 |
| 3,195,186 | 7/1965 | Gauban et al. | 18—43 |

W. L. McBAY, *Primary Examiner.*